US010895305B2

(12) United States Patent
Dalgord et al.

(10) Patent No.: US 10,895,305 B2
(45) Date of Patent: Jan. 19, 2021

(54) SINGLE MOTOR POWER SEAT

(71) Applicants: Magna Seating Inc, Aurora (CA);
 Rodney Dalgord, Highland, MI (US);
 David Runde, Beverly Hills, MI (US)

(72) Inventors: Rodney Dalgord, Highland, MI (US);
 David Runde, Beverly Hills, MI (US)

(73) Assignee: Magna Seating Inc, Aurora (CA)

( * ) Notice: Subject to any disclaimer, the term of this patent is extended or adjusted under 35 U.S.C. 154(b) by 475 days.

(21) Appl. No.: 15/740,857

(22) PCT Filed: Jul. 1, 2016

(86) PCT No.: PCT/US2016/040704
 § 371 (c)(1),
 (2) Date: Dec. 29, 2017

(87) PCT Pub. No.: WO2017/004521
 PCT Pub. Date: Jan. 5, 2017

(65) Prior Publication Data
 US 2018/0187751 A1 Jul. 5, 2018

Related U.S. Application Data

(60) Provisional application No. 62/187,525, filed on Jul. 1, 2015.

(51) Int. Cl.
 *F16H 1/22* (2006.01)
 *B60N 2/02* (2006.01)
 *F16H 1/16* (2006.01)
(52) U.S. Cl.
 CPC ............ *F16H 1/22* (2013.01); *B60N 2/0232* (2013.01); *B60N 2/0296* (2013.01); *F16H 1/16* (2013.01); *B60N 2002/0236* (2013.01)

(58) Field of Classification Search
 CPC ... F16H 3/34; F16H 55/17; F16H 1/22; F16H 1/16; B60N 2/0232; B60N 2/0296; B60N 2002/0236
 USPC .......... 74/813 R, 813 V, 325, 329, 331, 353, 74/820, 436; 297/330, 348, 347
 See application file for complete search history.

(56) References Cited

U.S. PATENT DOCUMENTS

| 1,848,315 | A | * | 3/1932 | Cage | F16H 1/02 74/665 H |
|---|---|---|---|---|---|
| 4,470,318 | A | | 9/1984 | Cremer et al. | |
| 5,365,301 | A | * | 11/1994 | Sugita | G03B 17/425 396/144 |
| 6,732,603 | B1 | * | 5/2004 | Hsu | F16H 37/065 475/12 |

(Continued)

FOREIGN PATENT DOCUMENTS

| EP | 0418516 | 3/1991 |
| GB | 2153218 | 8/1985 |
| WO | 8903322 | 4/1989 |

*Primary Examiner* — Victor L MacArthur
(74) *Attorney, Agent, or Firm* — Miller Canfield (57) ABSTRACT

A single motor gearbox assembly (100) including a shift motor (104) operatively connected to a shift worm (106), a worm gear (108), a drive selection arm (110), and a drive motor (116) operatively connected to a plurality of output gears (112a-112c) to selectively control multiple seat assembly functions. The single motor gearbox assembly (100) further includes a plurality of micro-switches (114a-114c) configured to activate/deactivate the shift motor (104) and the drive motor (116).

6 Claims, 7 Drawing Sheets

(56) References Cited

U.S. PATENT DOCUMENTS

| | | | |
|---|---|---|---|
| 6,761,438 B2 * | 7/2004 | Sato | B41J 2/17596 |
| | | | 347/84 |
| 2014/0352493 A1 * | 12/2014 | Chung | F16H 37/065 |
| | | | 74/813 R |

* cited by examiner

SINGLE MOTOR POWER SEAT

CROSS-REFERENCE TO RELATED APPLICATIONS

This application claims priority to U.S. Provisional Application No. 62/187,525, filed on Jul. 1, 2015.

BACKGROUND OF THE INVENTION

1. Field of the Invention

The present invention relates to a single motor gearbox for a vehicle seat. More particularly, the present invention relates to a single motor gearbox for a powered vehicle seat assembly for selectively controlling multiple functions of the seat assembly.

2. Description of Related Art

Automobile vehicles include seat assemblies for supporting an occupant within the vehicle. The seat assemblies typically include a generally horizontal seat cushion and a seat back pivotally coupled to the seat cushion. The seat assemblies are usually capable of being displaced for movement vertically, horizontally (fore and aft), angularly (or pivotally) and/or rotationally. Current devices for controlling the functional movements include electric rotary motors and gear actuator driven mechanisms. Each functional movement typically requires the use of a separate electric rotary motor or gear actuator driven mechanism to control each separate function. A similar requirement of multiple actuators is also often necessary in applications involving multiple functions. The electric rotary motors, gear actuator driven mechanisms, and multi-function controls are heavy, complex mechanisms that add significant expense to the seat assembly. Further, each individual electric rotary motor, gear actuator driven mechanism, or multi-function control used for seat adjustment is oftentimes cumbersome and may require a substantial use of space. Additionally, when these individual motors or control mechanisms malfunction or encounter problems, repair and/or replacement can be extremely expensive.

There are numerous methods and systems which attempt, with varying degrees of success, to address the current use of a separate electric rotary motors or gear actuator driven mechanisms to control each individual function of the seat assembly. The exemplary embodiments detailed herein address the issues associated with previous methods by providing a single motor for a powered seat assembly, as detailed herein below.

SUMMARY OF THE INVENTION

An exemplary embodiment includes a single motor gear box assembly including a drive motor, shift motor, shift worm, worm gear, a drive selection arm, a plurality of output gears, and a plurality of micro-switches. The shift worm, worm gear, drive selection arm, plurality of output gears, and micro-switches are all contained within a single housing. The drive motor and shift motor are disposed externally of the single housing and are operably connected thereto.

The drive motor is operably connected to a drive shaft and drive gear. The drive motor controls movement of the drive shaft and drive gear which are operably and selectively connected to the output gears. The shift motor is operably connected to the shift worm and drive selection arm. The shift worm is operably connected to the worm gear and the drive selection arm is operably connected to at least one intermediate gear for selectively coupling to at least one of the plurality of output gears.

During functional operation, the seat assembly may be operated to undergo a variety of desired selected functions. The functions include, but are certainly not limited to, vertical adjustment, horizontal adjustment (fore and aft), angular (or pivotal) adjustment, and/or rotational adjustments. The vertical adjustment generally involves an upward and downward displacement of the seat assembly. The horizontal adjustment generally involves a fore and aft displacement of the seat assembly. The angular adjustment generally involves a tilting of the seat assembly or pivoting of at least the seat back angularly with respect to the seat cushion in a forward/backward fashion. The rotational adjustment generally comprises a turning or revolving displacement of the seat assembly about an axis of the seat assembly.

A user engages a switch located externally on the seat assembly to select the desired function. Once the user selects the desired function, the shift motor operably rotates the shift worm, which operably engages and rotates the worm gear, which rotates the drive selection arm, and the drive selection arm ultimately engages and rotates at least one of the plurality of output gears associated with the desired function selected. The drive selection arm rotates until at least one of the plurality of micro-switches associated with the desired function is activated. Activation of the micro-switch blocks or stops power to the shift motor and implements the start of power provided to the drive motor. The drive motor then continues to operate or run until the user releases the switch located externally on the seat assembly and/or until the user selects another desired function.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE PREFERRED EMBODIMENTS

Figure 1:
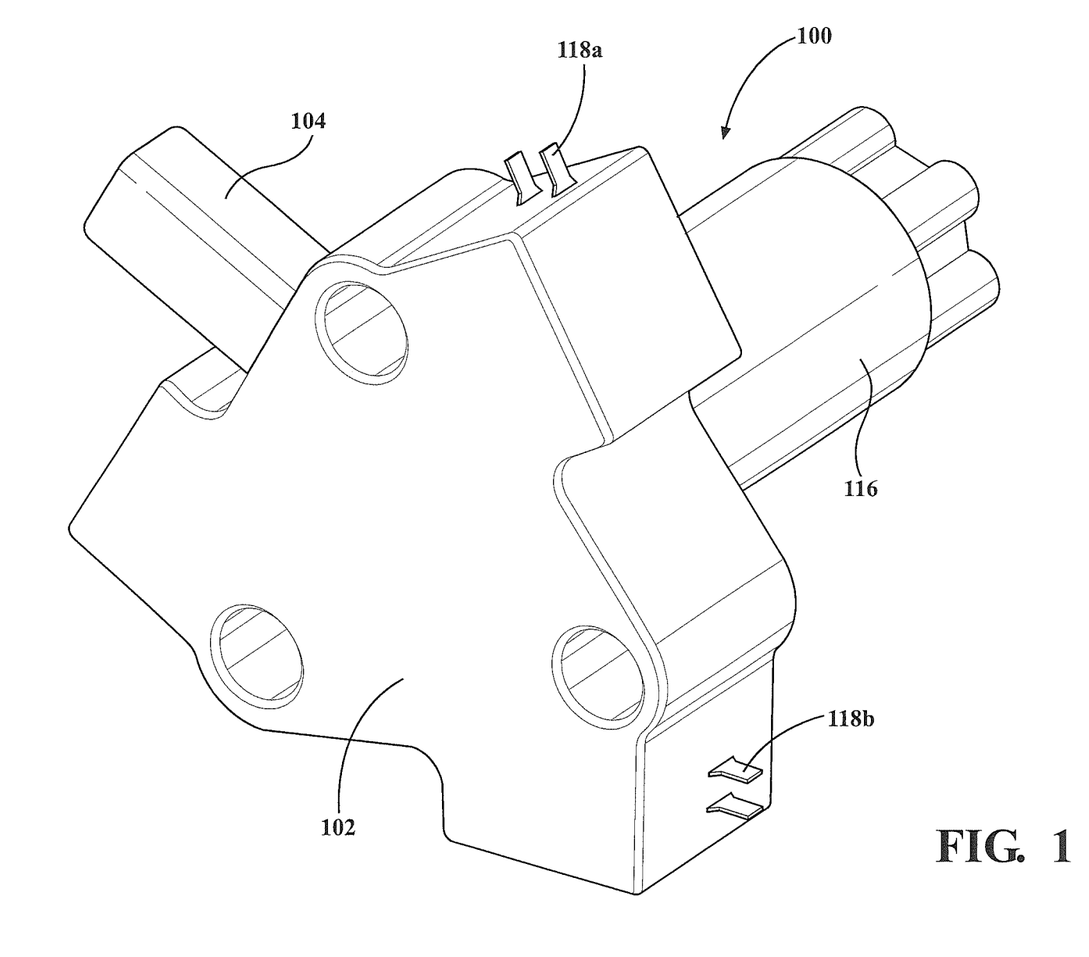
FIG. 1 is a perspective view of an exemplary embodiment of an exterior of the single motor gear box assembly.
Figure 2:
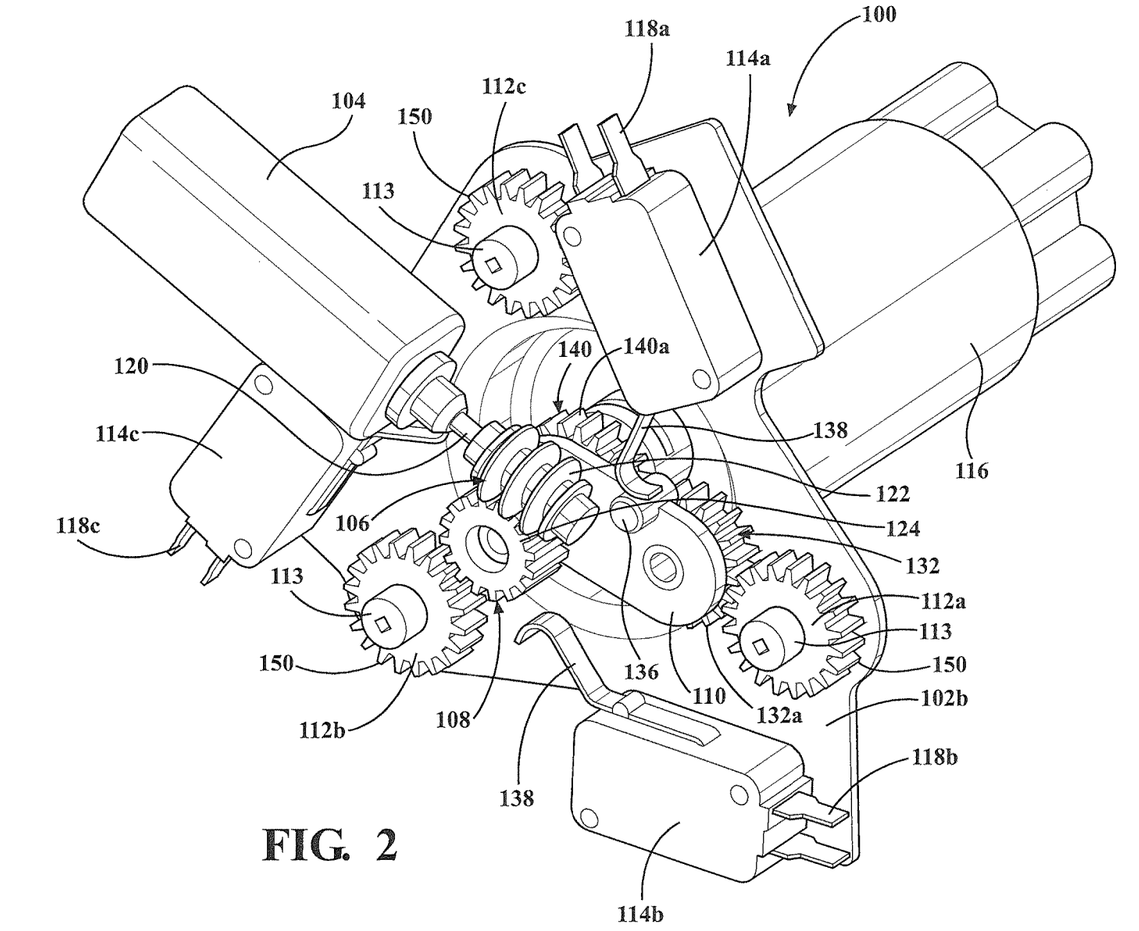
FIG. 2 is a perspective view of an exemplary embodiment of an interior of the single motor gear box assembly.
Figure 3:
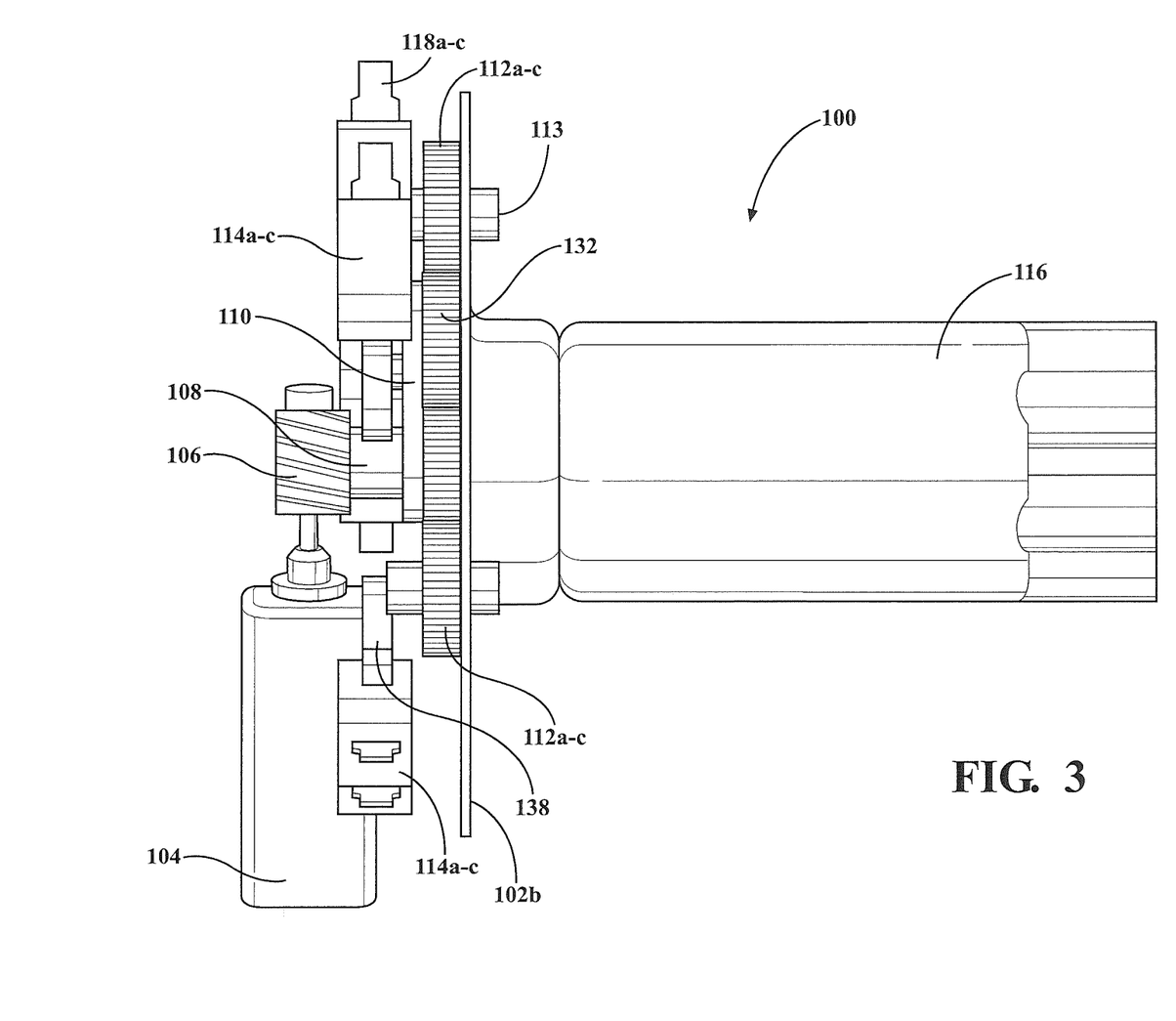
FIG. 3 is a side view of an exemplary embodiment of the single motor gear box assembly.
Figure 4:
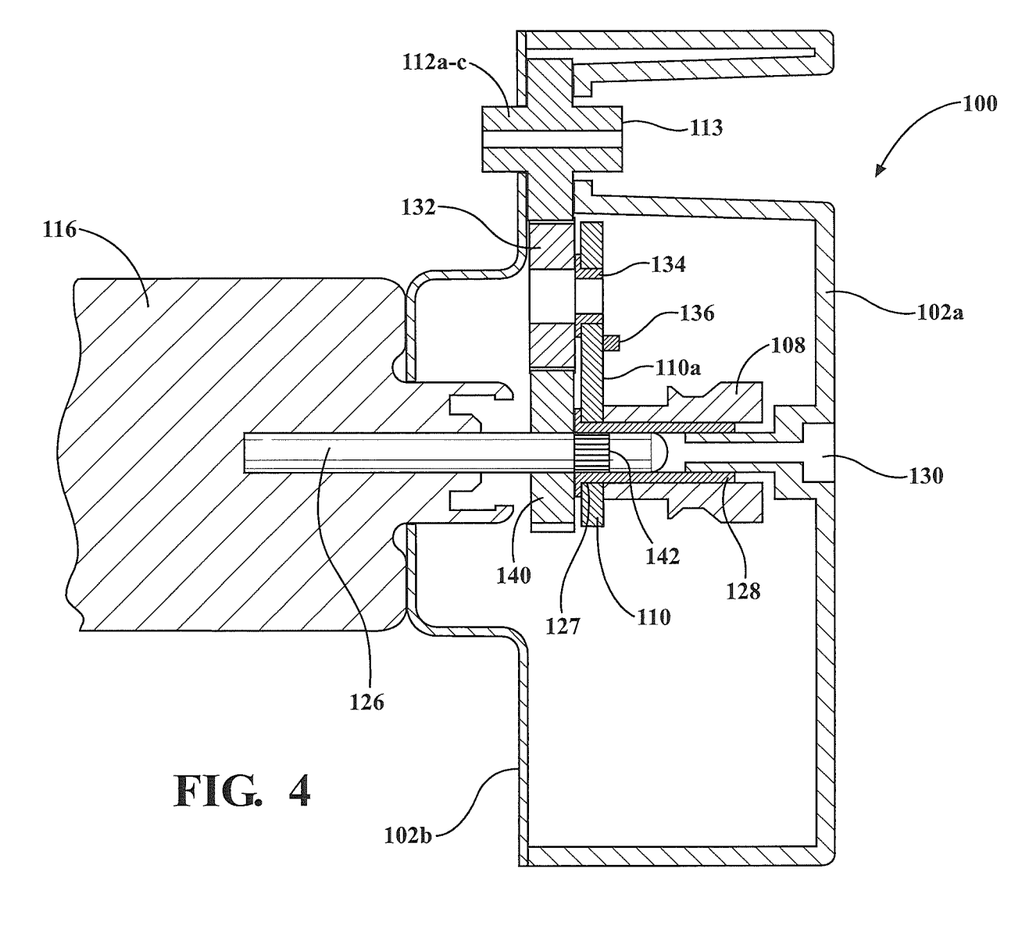
FIG. 4 is a cross-sectional view of the of an exemplary embodiment of the single motor gear box assembly.

Referring to FIG. 1, an exemplary embodiment of a single motor gearbox assembly is shown at 100. The gearbox assembly 100 includes a housing 102. A shift motor 104 and a drive motor 116 are operably connected to the housing 102. The housing 102 comprises a front cover 102a connected to a back cover 102b which forms a cavity therebetween. The drive motor 116 is supported by the back cover 102b and the shift motor 104 is supported by the front cover 102a. Switch terminals 118a-118c, which are operably connected to a respective one of a plurality of micro-switches 114a-114c, project outwardly from the housing 102 for connecting to a power source (not shown). The switch terminals 118a-118c allow for the plurality of micro-switches 114a-114c to be connected to an external power source (not shown), which controls operation of the components of the single motor gearbox assembly 100.

Referring to FIGS. 1-4, the single motor gearbox assembly 100 includes the shift motor 104, a shift worm 106, a worm gear 108, a drive selection arm 110, a plurality of output gears 112a-112c, a plurality of micro-switches 114a-114c, and the drive motor 116. The drive motor 116 includes a drive shaft 126 extending through the back cover 102a and rotatably driven by the drive motor 116. A main drive gear 140 is fixedly secured to the drive shaft 126 by splines 142, or other press fit connection, and includes gear teeth 140a. The shift motor 104 includes a shift motor shaft 120 operably connected thereto and extending outwardly therefrom. The shift motor shaft 120 is operably connected to and drives the shift worm 106. Using a switch (not shown) positioned externally on a seat (not shown), a user selects a desired seat adjustment or function. The external switch is connected to an external power source and controller (not shown), and provides an electronic control command to the shift motor 104 wherein the shift motor 104 controls rotation of the shift motor shaft 120. As the shift shaft 120 rotates, the shift worm 106 rotates.

The shift worm 106 is spiral shaped such that upon rotation, spiral formations 122 of the shift worm 106 are engaged with worm teeth 124 formed on the worm gear 108. Engagement of the spiral formations 122 of the shift worm 106 with the worm teeth 124 formed on the worm gear 108 causes rotation of the worm gear 108. The won't gear 108 is concentrically disposed about and supported by the drive shaft 126 of the drive motor 116 at one end thereof and is concentrically disposed about and supported by a pinion shaft 130 projecting from the front cover 102a of the housing 102 at an opposing end thereof A bushing 128 is disposed between the drive shaft 126 and the worm gear 108 to allow the worm gear 108 to spin freely with respect to the drive shaft 126. As such, the worm gear 108 is non-operational while the drive shaft 126 is operating. The drive shaft 126 and bushing 128 also extend through an aperture 127 in the drive selection arm 110, the aperture 127 being aligned with the axis of the drive shaft 126 and worm gear 108. Although the worm gear 108 spins freely with respect to the drive shaft 126, the worm gear 108 is operably fixed to the drive selection arm 110. Hence, rotation of the worm gear 108 effectively results in rotation of the drive selection arm 110. The drive selection arm 110 may be operably rotated 360°. The drive selection arm 110 further includes a cam pin 136 projecting outwardly from a surface 110a of the drive selection arm 110 adjacent the worm gear 108 for engagement and selective actuation with each of the micro-switches 114a-114c. An intermediate drive gear 132 is rotatably coupled to the drive selection arm 110 at the end opposite the aperture 127 by a bushing 134. The intermediate drive gear 132 includes gear teeth 132a in meshed engagement with the gear teeth 140a of the main drive gear 140.

A plurality of micro-switches 114a-114c are fixedly secured to the back cover 102b and spaced about the perimeter thereof Each micro-switch 114a-114c includes switch terminals 118a-118c extending therefrom and projecting through the front cover 102a for connecting to an electrical power source. Each micro-switch 114a-114c also includes an actuation lever 138 projecting radially inwardly around the perimeter of the back cover 102b for selective engagement by the drive selector arm 110.

Finally, a plurality of output gears 112a-112c are rotatably supported by the back cover 102b via shafts 113 and include gear teeth 150 for selective meshed engagement with the gear teeth 132a of the intermediate drive gear 132.

In operation, the user selects a desired seat function through the switch which powers and actuates the shift motor 104. The shift motor 104 spins the shift motor shaft 120. The shift motor shaft 120 rotates the shift worm 106 which engages the worm gear 108. The worm gear 108 affects movement of the drive selector arm 110 which rotates the cam pin 136 to make contact with at least one of a plurality of levers 138 of the micro-switches 114a-114c corresponding to the desired seat function selected by the user and activated by the switch. The plurality of levers 138 are operably connected, respectively, to at least one of a plurality micro-switches 114a-114c. Contact of the cam pin 136 with at least one of the plurality of levers 138 shuts off power and thus rotation of the drive selection arm 110 based on the desired user selected function. Contact of the cam pin 136 with at least one of the plurality of levers 138 also activates the drive motor 116 to drive and rotate the drive shaft 126 and main drive gear 140. When the levers 138 activate the drive motor 116, actuation and operation of the shift motor 104 is halted. As the drive gear 140 rotates, the drive gear teeth 140a engage with intermediate gear teeth 132a formed on the intermediate gear 132, thereby causing rotation of the intermediate gear 132. The intermediate gear 132 is aligned and operatively disposed between the drive gear 140 and at least one of a plurality of the output gears 112a-112c based on the user selected function. The intermediate gear 132 engages with a respective output gear 112a-112c, thereby resulting in rotation of the output gear 112a-112c which effects implementation of the user selected function.

Figure 5:
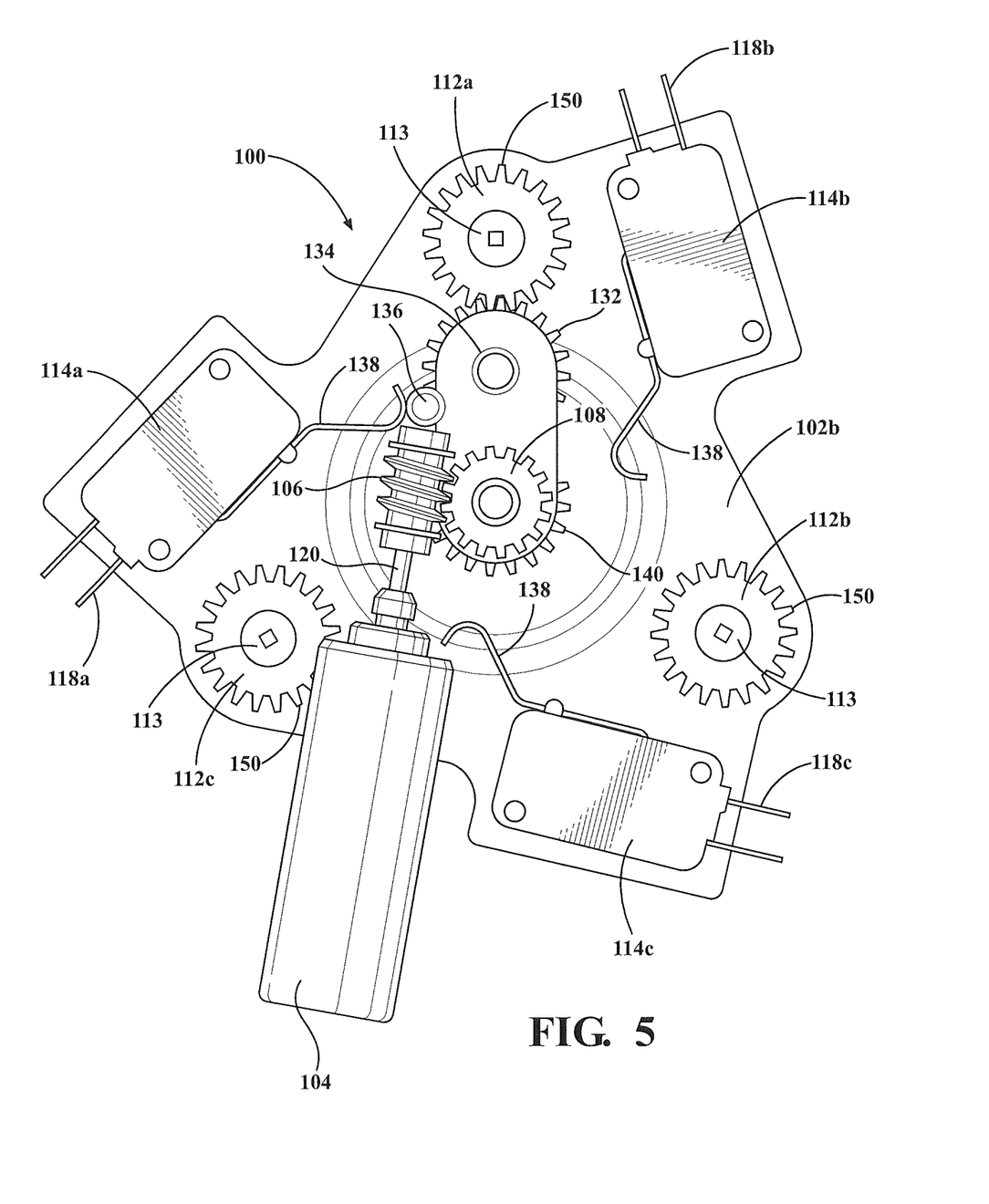
FIG. 5 is a front view of an exemplary embodiment of the interior of the single motor gear box assembly detailing the user selection input engaging at least one of the plurality of output gears.

For example, in reference to FIG. 5, the user has selected a desired function and the drive selection arm 110 is rotated in either the clockwise or counterclockwise direction until the cam pin 136 contacts the lever 138 of the micro-switch 114a and is aligned with the output gear 112a. At this position, the shift motor 104 is now turned off as indicated by engagement of the respective one of the plurality of levers 138 making contact with the cam pin 136 and the intermediate gear 132 is in meshed engagement with the output gear 112a. The controller actuates the drive motor 116 to rotate the drive shaft 126 and main drive gear 140. The main drive gear 140 rotates the intermediate gear 132 which in turn rotates the output gear 112a to actuate the user-selected seat function.

Figure 6:
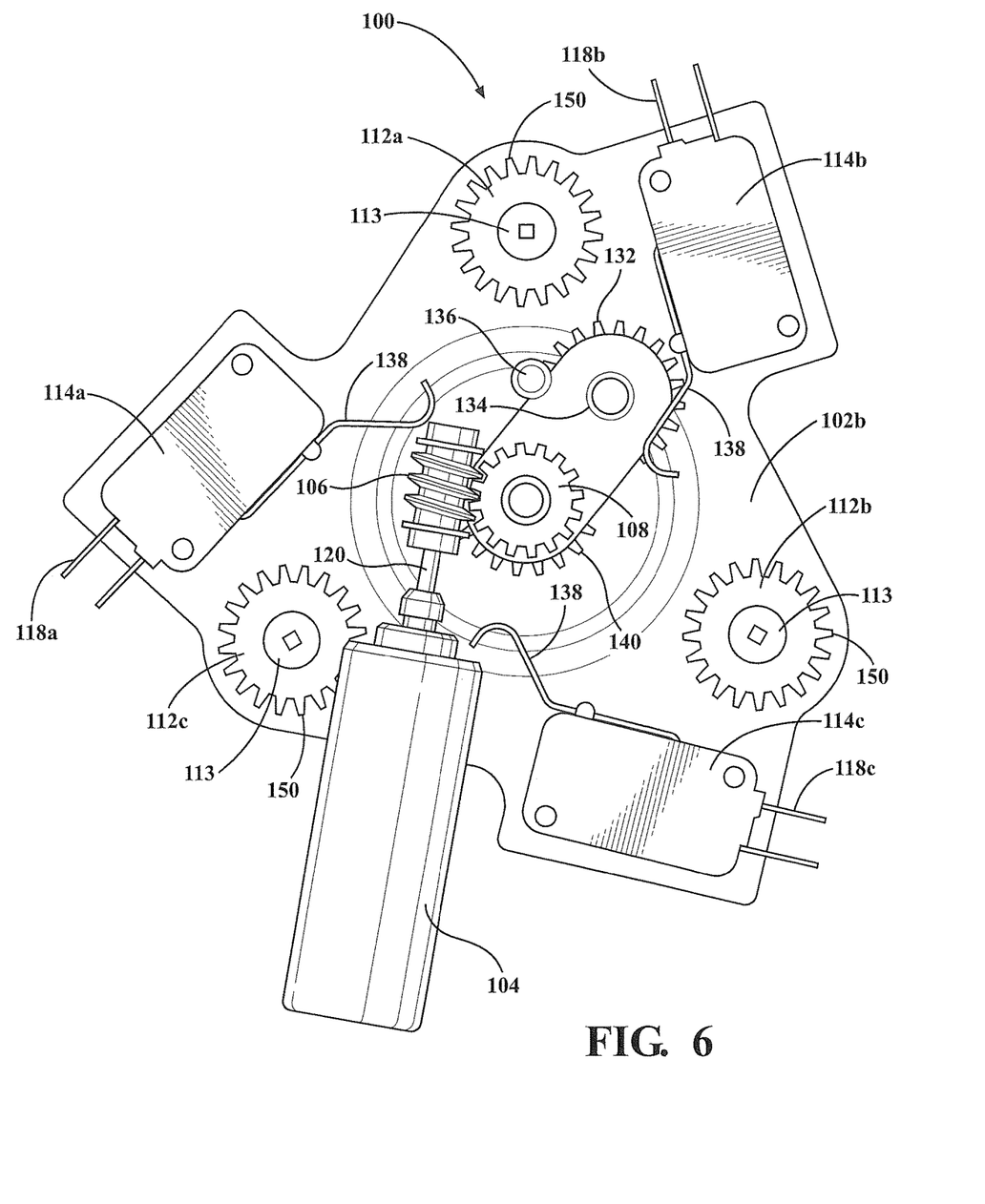
FIG. 6 is a front view of an exemplary embodiment of the interior of the single motor gear box assembly detailing the drive selection arm rotated between the plurality of output gears.
Figure 7:
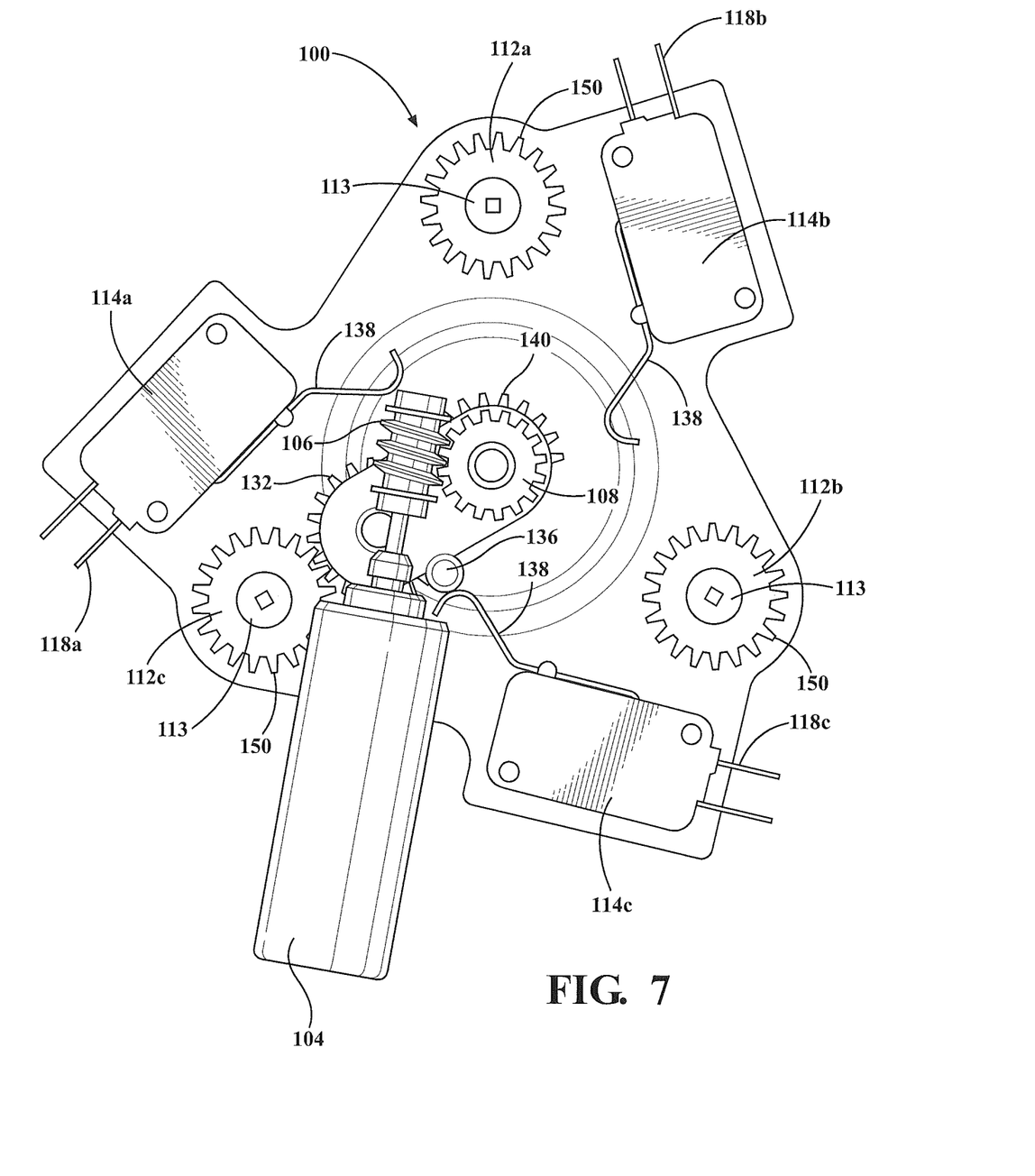
FIG. 7 is a front view of an exemplary embodiment of the interior of the single motor gear box assembly detailing activation of the micro-switch and engagement of a different output gear.

Referring to FIGS. 6 and 7, the user has selected another desired function and the drive selection arm 110 is further rotated by actuation of the shift motor 104. The lever 138 of the micro-switch 114a is no longer in contact with the cam pin 136. The drive selection arm 110 is spaced to pass slightly under the plurality of lever aims 138, as shown in FIG. 6, until the drive selection arm 110 rotates and the cam pin 136 is positioned for contact with the lever arm 138 of the micro-switch 114c corresponding to the user selected function wherein power to the shift motor 104 is shut off thereby halting further movement of the drive selection arm 110 as shown in FIG. 7. The intermediate gear 132 is now in meshed engagement with the output gear 112c. The controller again actuates the drive motor 116 to rotate the drive shaft 126 and main drive gear 140. The main drive gear 140 rotates the intermediate gear 132 which in turn rotates the output gear 112c to actuate the user selected seat function.

It should be appreciated that the number of output gears 112 and micro-switches 114 may vary based on the corresponding number of seat functions or adjustments desired by the powered seat assembly wherein each output gear 112 is selectively engaged by the drive selection arm 110 and intermediate gear 132 while still maintaining a single drive motor 116 for actuating each of the output gears 112 and seat functions.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A single motor gearbox assembly (100) for driving multiple selected outputs, the assembly comprising:
    a housing (102);
    a shift motor (104) supported by the housing (102);
    a drive motor (116) supported by the housing (102) for driving a main drive gear (140);
    a plurality of spaced apart output gears (112a-112c) rotatably supported by the housing (102) and selectively driven by the drive motor (116);
    a drive selection arm (110) operatively coupled to said shift motor (104) for actuation between select positions aligned with at least one of said output gears (112a-112c), said drive selection arm (110) including an intermediate gear (132) meshed between said main drive gear (140) and one of said output gears (112a-112c) in response to alignment of said drive selection arm (110) with the output gear (112a-112c) in the select position for actuating and driving the output gear (112a-112c) and the selected output; and
    a plurality of micro-switches (114a-114c) operably connected to interchangeably activate and deactivate the shift motor (104) for alignment of the drive selection arm (110) with one of the output gears (112a-112c) and the drive motor (116) for driving the main (140), intermediate (132), and output gears (112a-112c).

2. The single motor gearbox assembly (100) as set forth in claim 1 further comprising a cam pin (136) fixedly connected to the drive selection arm (110) wherein the cam pin (136) implements the activation and deactivation of the plurality of micro-switches (114a-114c).

3. The single motor gearbox assembly (100) as set forth in claim 2 wherein the drive selection arm (110) is configured for 360° rotation.

4. The single motor gearbox assembly (100) as set forth in claim 2 wherein each of the plurality of micro-switches (114a-114c) further includes, respectively, a plurality of levers (138) connected thereto configured for selective contact with the cam pin (136).

5. The single motor gearbox assembly (100) as set forth in claim 2 wherein the shift motor (104) includes a shift drive shaft (120) for rotating a shift worm (106) and the drive selection arm (110) includes a worm gear (108) in meshed engagement with the shift worm (106) for rotating the drive selection arm (110) into alignment with one of the output gears (112a-112c) in response to actuation of the shift motor (104).

6. The single motor gearbox assembly (100) as set forth in claim 2 wherein the drive motor (116) is operatively connected to rotate the drive shaft (126) and the drive shaft (126) is operatively connected to rotate the main drive gear (140); the drive gear (140) is operatively connected to rotate the intermediate gear (132) and at least one of the plurality of output gears (112a-112c) in response to the drive selection arm (110) aligned with the at least one of the plurality of output gears (112a-112c).

* * * * *